March 15, 1966  R. B. BENNETT  3,240,275
HYDRAULICALLY OPERABLE PITCH AIRCRAFT PROPELLER
Filed Dec. 3, 1963  3 Sheets-Sheet 1

INVENTOR.
RAYMUR B. BENNETT
BY
*William V. Ely*
HIS ATTORNEY

March 15, 1966 R. B. BENNETT 3,240,275
HYDRAULICALLY OPERABLE PITCH AIRCRAFT PROPELLER
Filed Dec. 3, 1963 3 Sheets-Sheet 2
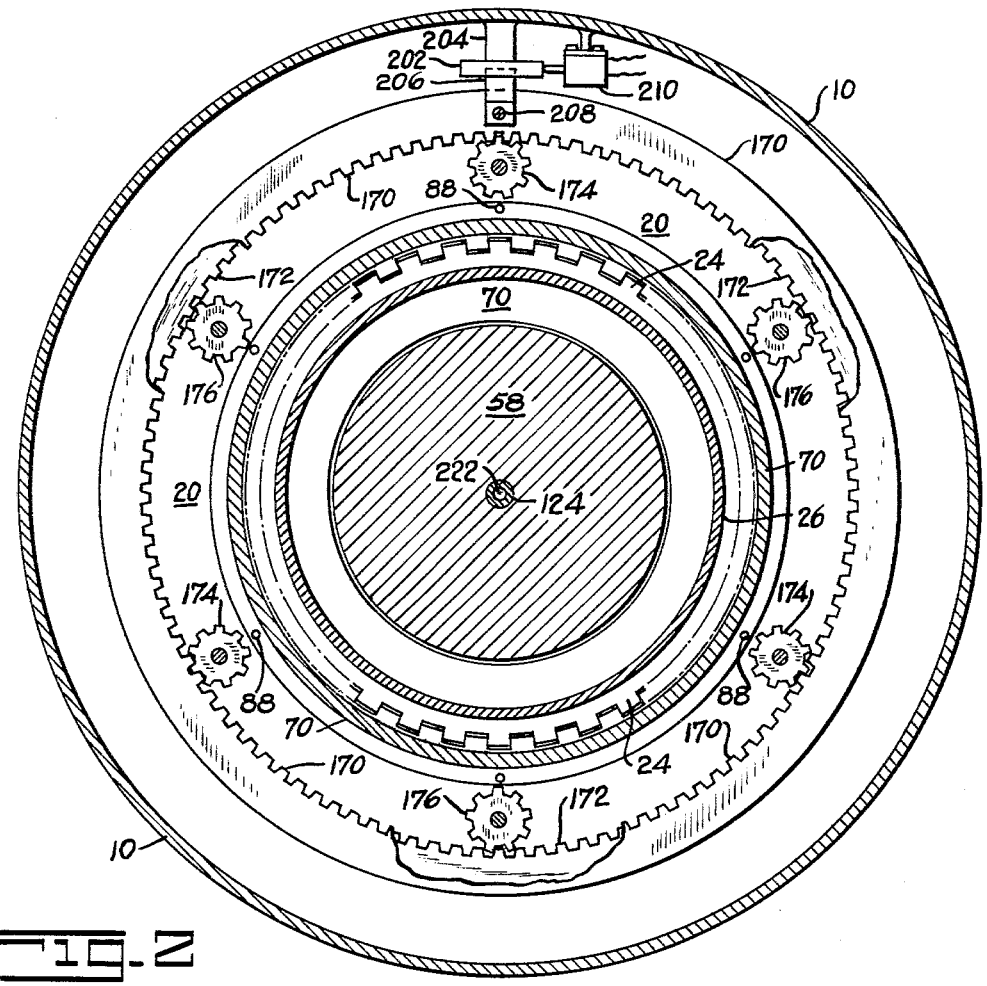
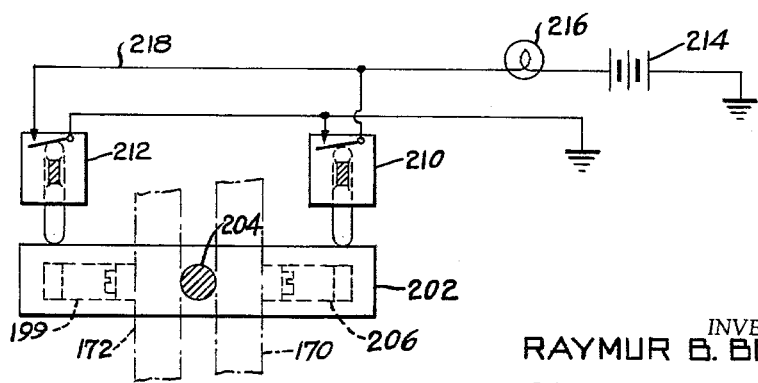
INVENTOR.
RAYMUR B. BENNETT
BY
William V. Ebs
HIS ATTORNEY March 15, 1966  R. B. BENNETT  3,240,275
HYDRAULICALLY OPERABLE PITCH AIRCRAFT PROPELLER
Filed Dec. 3, 1963  3 Sheets-Sheet 3

INVENTOR.
RAYMUR B. BENNETT
BY
William V. Ebs
HIS ATTORNEY

United States Patent Office)

3,240,275
Patented Mar. 15, 1966

3,240,275
HYDRAULICALLY OPERABLE PITCH AIRCRAFT
PROPELLER
Raymur B. Bennett, Wayne, N.J., assignor to Curtiss-
Wright Corporation, a corporation of Delaware
Filed Dec. 3, 1963, Ser. No. 327,722
5 Claims. (Cl. 170—160.32)

My invention relates to variable pitch propellers More particularly the invention relates to a hydraulically operable control system for effecting pitch adjustments of a propeller blade.

Although the invention is not limited in application to particular types of aircraft it is especially suited to vertical take-off and landing aircraft utilizing tiltable propellers to lift and propel the aircraft and also for attitude control, that is, aircraft of the type disclosed, for example, in Patent No. 3,106,369, for Aircraft and Method of Operating Same, of Henry V. Brost, issued October 8, 1963, and the application of Norman C. Olson, Serial No. 91,683, filed February 27, 1961, now Patent No. 3,181,810, covering Attitude Control System for "VTOL Aircraft." It is especially important in such aircraft that the blades of a propeller not be permitted to go to flat pitch because of a failure in the pitch control system of the propeller, since the loss of pitch would markedly decrease lift forces on the aircraft and might make it impossible for the pilot to maintain adequate control of the airplane.

A prime object of this invention is to provide an improved variable pitch hydraulically controllable propeller which is constructed to render very unlikely the possibility of an undesirable decrease in pitch of the blades due to a failure in the hydraulic system.

It is another object of the invention to provide an improved variable pitch hydraulically controllable propeller which is constructed to prevent an undesirable increase in blade pitch.

It is another object of the invention to provide an improved variable pitch hydraulically controllable propeller which is so arranged that pitch control may be maintained following a marked loss of pressure in the hydraulic system.

It is another object of the invention to provide an improved variable pitch hydraulically controllable propeller capable of effecting the same change in pitch in response to a given input signal after a failure resulting in a marked loss of pressure in the hydraulic system as before the occurrence of the failure.

It is still another object of the invention to provide an improved variable pitch hydraulically operable propeller wherein a single piston for positioning pitch changing mechanism is actuable by fluid pressure in either one or both of dual pressure chambers.

It is a further object of the invention to provide an improved variable pitch hydraulically operable propeller wherein a single piston for positioning pitch changing mechanism is actuable according to the operation of a pair of control valves each of which regulates pressure in one of a pair of dual pressure chambers and which are controlled by mechanism effective to operate one valve in the event the other valve is prevented from operating.

Other objects and advantages of the invention will become apparent during a reading of the specification taken in connection with the accompanying drawings in which:

FIGURE 2 is a cross-sectional view taken on the plane of the line 2—2 of FIGURE 1;

FIGURE 3 is a view taken on the plane of the line 3—3 of FIGURE 2; and

Figure 1:
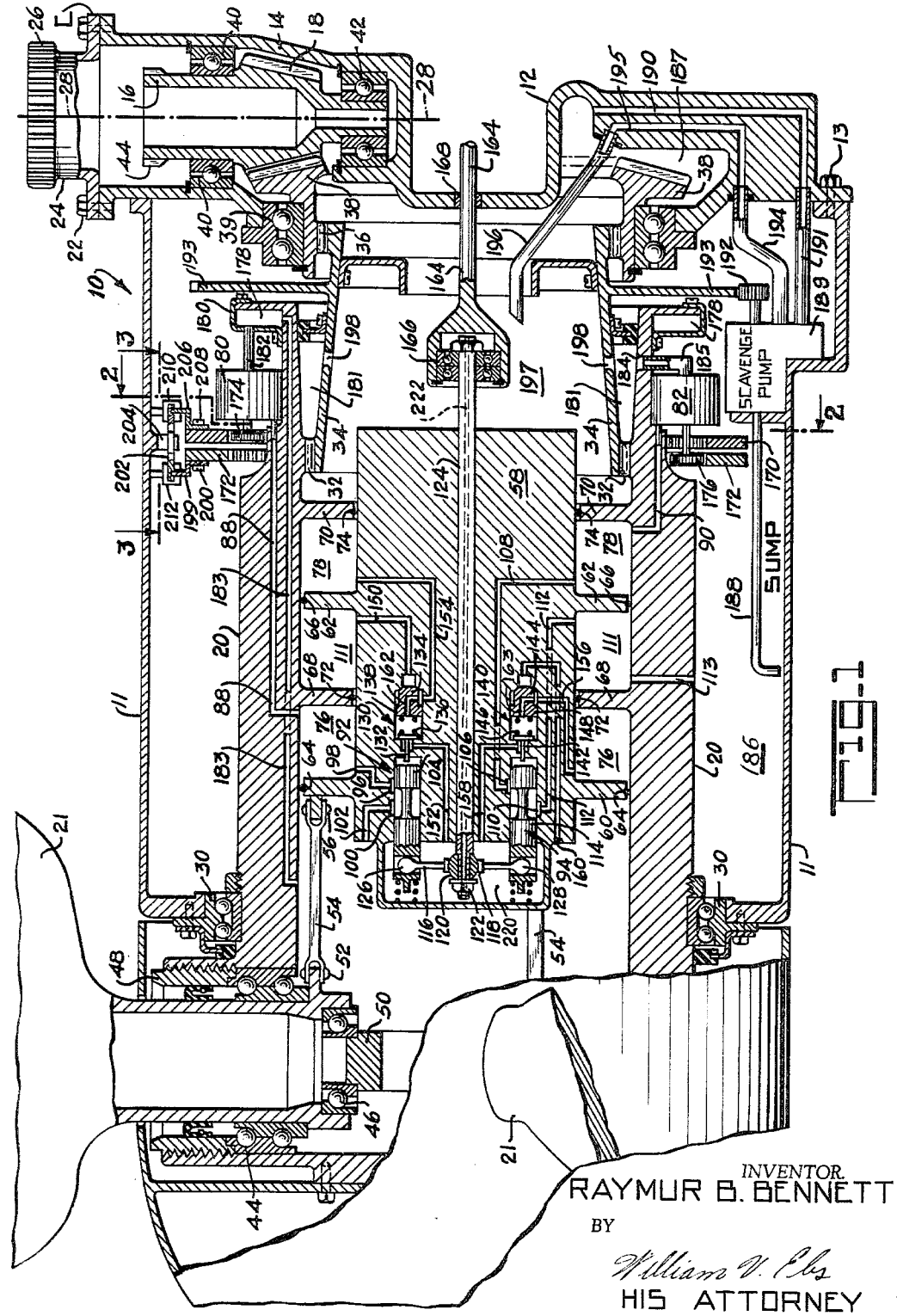
FIGURE 1 is a longitudinal vertical sectional view diagrammatically illustrating the mechanism of a propeller embodying the features of the invention.
Figure 4:
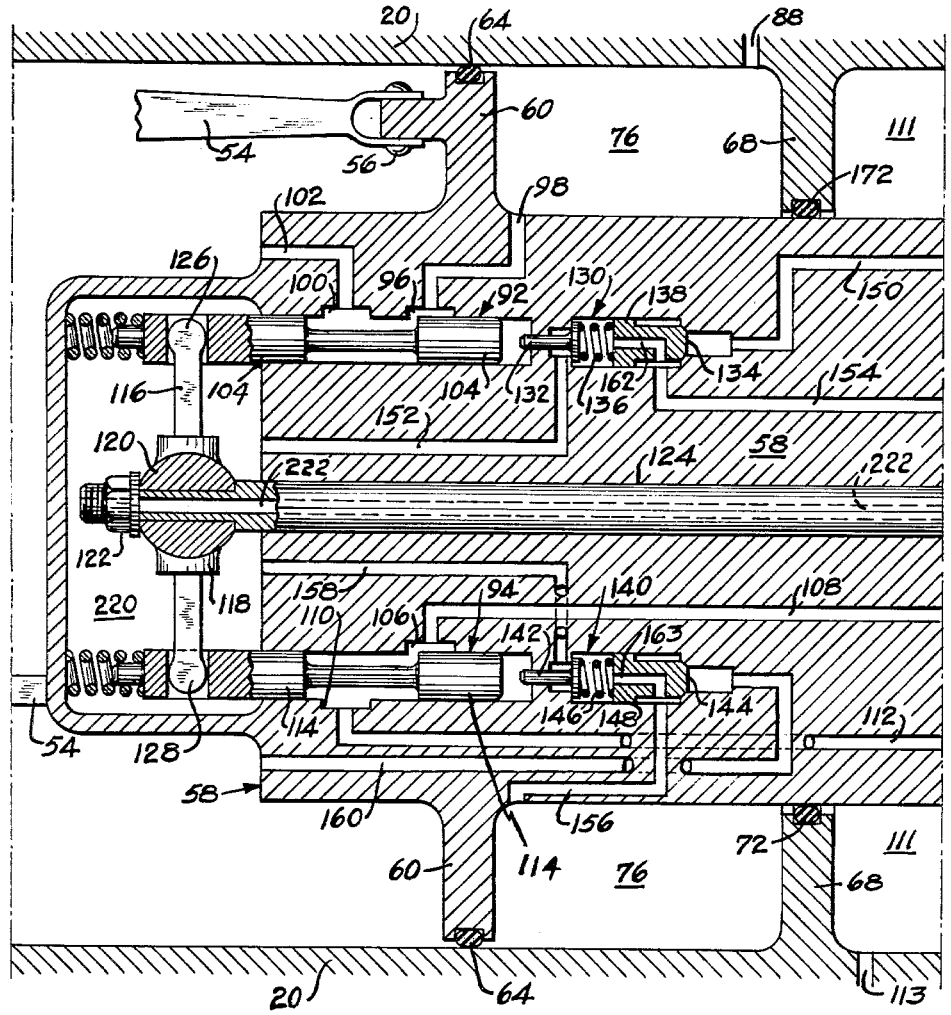
FIGURE 4 is an enlarged view of a portion of the mechanism of FIGURE 1.

Referring to the drawings, reference character 10 designates the nacelle housing of the propeller. Such nacelle housing comprises portions 11 and 12 which are bolted together at 13 and which encase the pitch changing mechanism of the propeller. Housing portion 12 is adapted at 14 to encase shaft 16 and drive gear 18 by means of which the propeller hub 20 and propeller blades 21 are rotated. As shown, housing portion 12 is secured at 22 to a collar 24 having splines 26 thereon for connecting the collar to an actuating shaft (not shown) by means of which the propeller may be tilted about axis 28.

Hub 20 is rotatably mounted within the nacelle housing on bearings 30 which are designed to withstand both radial and axial loads. The hub is spline connected at 32 to a drive tube 34, and the drive tube is spline connected at 36 to bevel gear 38. The bevel gear 38 is rotatably mounted on bearings 39 which are supported in housing portion 12. Gear 38 is engaged by the drive gear 18 on shaft 16. The shaft 16, which is rotatably mounted on bearings 40 and 42, is provided with splines 44 for connecting the shaft 16 to transmission shafting of an aircraft. Upon rotation of shaft 16, the propeller hub 20 and the blades 21, which are mounted in the hub, are driven through gears 18 and 38, and drive tube 34. Although a three-bladed propeller has been illustrated in the drawings, the invention is in no way limited to a propeller having this number of blades, but is applicable to a propeller having two blades or any number in excess of two.

Each blade 21 is rotatably mounted on bearings as 44 and 46 in the hub structure wherein each of the blades is axially confined as by nut 48 and a bearing support block 50. Pitch changes are accomplished by rotating the propeller blades as desired about the common axis of the blade supporting bearings 44 and 46. Each propeller blade pivotally connects as at 52 with one end of a link 54, which pivotally connects at its other end as at 56, with a cylindrical piston 58. Pitch of the propeller blades is increased upon movement of the piston 58 toward the left as viewed in FIGURE 1 and pitch is decreased when the piston moves toward the right. The piston 58 rotates with the hub 20 and propeller blades 21.

Piston 58 is formed with spaced flange portions 60 and 62, the outer peripheries of which are provided with seals 64 and 66 that bear against the internal cylindrical surface of the hub structure 20. The hub structure 20 includes internally projecting flange portion 68 which is between the flange portions 60 and 62 of the piston, and also includes internally projecting flange portion 70. Flange portions 68 and 70 of hub structure 20 are provided with seals 72 and 74 respectively, which engage the surface of the piston. Adjacent flange portions 60 and 68 form annular chamber 76, and adjacent flange portions 62 and 70 form the annular chamber 78.

The annular chambers 76 and 78 connect with high pressure pumps 80 and 82 mounted on hub structure 20. Preferably there are a plurality of the pumps 80, circumferentially disposed on the hub and each connected by a high pressure line, such as the line 88, with chamber 76; and an equal number of like pumps 82, also circumferentially disposed on the hub and each connected by a high pressure line, as the line 90, with chamber 78. The pumps 80 and 82 are driven by rotation of the propeller hub in a manner which will be made clear hereinafter. Pumps 80 deliver fluid to chamber 76 wherein pressure is controlled by value 92, and pumps 82 deliver fluid to chamber 78 wherein pressure is controlled by valve 94. The valve 92 includes valve port 96 which connects over pressure line 98 with annular pressure chamber 76, and valve port 100 which connects with line 102. The valve 92 also includes valve spool 104 which is slidable within the piston 58. Valve 94 includes port 106 which connects over pressure line 108 with the annular chamber 78 and also includes port 110 which connects over line 112 with a chamber 111 formed between flange portions 68 and 62 of the hub structure 20 and piston 58 respectively. Valve 94 includes the valve spool 114 slidably mounted within the piston 58.

The valve spools 104 and 114 are actuable by a link 116 which is integral with a ring 118 that can pivot on a ball 120, the ball being secured as by the nut 122 on the end of a control rod 124, which is slidable in the piston. Normally the valve spools 104 and 114 are moved together equal distances in the piston when the control rod 124 is moved either to the right or left. If, however, one of the valve spools is prevented from moving, the other valve spool is actuated by movement of the control rod. As shown, the link 116 has ball formations 126 and 128 at opposite ends slidable within openings in the spools. If valve spool 104 is prevented from moving, link 116 pivots about ball formation 126 to actuate valve spool 114; whereas if valve spool 114 is prevented from moving, the link 116 pivots about ball formation 128 to actuate valve spool 104. The link 116 connects with the respective valve spools at equal distances from the control rod 124 and therefore whenever one valve spool is prevented from moving the other is moved twice the distance which it would be normally moved in response to a given linear movement of the rod 124.

A poppet valve is provided in the piston 58 behind each of the valves 92 and 94. Poppet valve 130, located behind the valve 92 includes plunger 132 which is actuable by the valve spool 104, and piston 134 which is biased by spring 136 toward one end of the valve chamber 138. Poppet valve 140, which is located behind the valve 94, includes plunger 142 which is actuable by the valve spool 114, and includes piston 144 which is biased by spring 146 toward the one end of the valve chamber 148. The valve chamber 138 of valve 130 is connectable over line 150 with the annular chamber 111 and is also connectable with line 152. Valve chamber 138 connects over line 154 with the annular chamber 78. Valve chamber 148 of valve 140 connects over line 156 with the annular chamber 76 and is connectable with lines 158 and 160. High pressure fluid is supplied to the poppet valve 130 from annular chamber 78 over the line 154 and to the poppet valve 140 from annular chamber 76 over the line 156. The high pressure fluid is conveyed through the passage 162 to the left end of the piston 134 of valve 130, and through the passage 163 to the left end of the piston 144 of the poppet valve 140. Normally the pistons 134 and 144 of the poppet valve are maintained at the rightward ends of the valve chambers by hydraulic force on the left side of the pistons and the valve springs. In their rightward positions, piston 134 of valve 130 seals off the connection of valve chamber 138 with line 150 and annular chamber 111, and piston 144 of valve 140 seals off the connection of valve chamber 148 with line 160.

As indicated hereinbefore, the propeller blades are rotated by shaft 16 which drives the propeller hub through meshing gears 18, 38 and drive tube 34. Pitch changes are accomplished upon linear movement of control rod 124 in the piston 58. Although control rod 124 rotates with the hub 20 and the piston 58, such rotational motion of the control rod 124 is isolated from actuating linkage which includes the actuating member 164. As shown in FIGURE 1, control rod 124 is mounted for rotation on bearings 166 which are located at the end of actuating member 164. Actuating member 164, which imparts linear movement to control rod 124, is slidably mounted at 168 in the housing 12.

As the hub rotates, the pumps 80 and 82 are driven by ring gears 170 and 172 which engage the pump drive gears 174 and 176 respectively. As mentioned, the pumps 80 connect with and supply fluid under pressure to annular chamber 76 and the pumps 82 connect with and supply pressurized fluid to annular chamber 78. Normally equal pressures are maintained in both chambers, which pressures are determined according to the positions of the valve spools 104 and 114. Fluid flows through two independent circuits, one circuit including the pumps 80, an annular reservoir 178 for such pumps formed on the hub by housing 180, the annular chamber 76, and valve 92; the other circuit including the pumps 82, an annular reservoir 181 for these pumps formed between the hub and drive tube 34, the annular chamber 78 and valve 94.

In the one circuit fluid is supplied from annular reservoir 178 through line 182 to the pumps 80 which deliver pressurized fluid through line 88 to the annular chamber 76. Fluid flows from annular chamber 76 through line 98, enters valve 92 by way of port 96, exits from the valve through port 100 and then flows through line 102 to discharge into the hub. Some of the fluid which accumulates in the hub is forced by centrifugal action into the bearings which rotatably support the propeller blades and adequate lubrication of these bearings is thereby assured. For the most part, however, fluid in the hub is pumped by centrifugal force into line 183 and it flows through this line back to reservoir 178 to complete the circuit. In the other circuit, fluid is supplied from annular reservoir 181 through passage 184 and line 185 to the pumps 82 which deliver pressurized fluid through line 90 to annular chamber 78. Fluid flows from annular chamber 78 through line 108, enters valve 94 by way of port 106, exits from the valve through port 110, and then flows through line 112 into annular chamber 111. Fluid flows from annular chamber 111 through hub passage 113 into the space 186 between the hub 20 and housing portion 11 of the nacelle. Some of this fluid finds its way from space 186 into space 187 when the propeller is tilted upwardly from the horizontal about axis 28. Fluid in space 186 is sucked into one input line 188 of a scavenger pump 189 mounted on nacelle housing portion 11, and fluid which is present in space 187 in the titled positions of the propeller is sucked into the scavenger pump through passage 190 and a second input line 191 of the pump. The pump 189 is driven by gear 192, the gear 192 being driven by gear 193 on drive tube 34 as the propeller rotates. Pump 189 delivers fluid through line 194, passage 195 and line 196 to the confined region 197 within drive tube 34. Centrifugal action forces accumulated fluid in region 197 through passage 198 back into reservoir 181.

As has been indicated, the pumps 80 and 82 are driven upon rotation of the hub by the ring gears 170 and 172 which engage the pump drive gears 174 and 176 respectively. As may be seen, the ring gear 172 has a member 199 affixed thereon as at 200. The outward end of the member 199 fits snugly into a recess at one end of a member 202 which is pivotally mounted on a stub shaft 204. The outward end of a member 206, which is secured at 208 to the ring gear 170, fits snugly in a recess at the other end of the member 202. When the pumps 80 and 82 operate against equal pressure heads, the ring gears 170 and 172 acting through the members 206 and 199 respectively exert equal and balancing forces on the member 202 about its pivotal axis such that no pivotal movement of the member 202 and no relative motion of the ring gears occurs. When, however, the pressure at which fluid is discharged from the pumps 80 is caused to differ from the pressure at which fluid is discharged from the pumps 82, unequal torque reactions result on the ring gears 170 and 172 and result in unequal forces on the opposite end portions of the member 202. The member 202 pivots slightly on the stub shaft 204 in one direction or the other, according to which of the pumps 80 or 82 is discharging at the higher pressure. Contact 210 or 212 is closed by member 202 (FIGURE 3) to complete a circuit extending from the battery 214, through the lamp 216, and over line 218, and the lamp which would be located in the cockpit of the aircraft lights to visually indicate that pressure downstream from the pumps 80 differs from pressure downstream from the pumps 82.

When the propeller is functioning normally, the valve spools 104 and 114 are disposed in corresponding positions and each of the annular chambers 76 and 78 is supplied with fluid at the same pressure. The propeller blades assume a blade angle position in which forces on the piston 58, due to the pressurized fluid in the annular chambers 76 and 78, and oppositely directed forces on the piston due to twisting moments on the blade resulting from aerodynamic forces which act thereon, are in balance. The valve spools 104 and 114 are moved equally in response to a given linear movement of the control rod 124 and the respective valve ports 96 and 98 are closed or opened like amounts to increase or decrease blade angle. Pitch is increased when member 164 and control rod 124 are moved to the left as viewed in FIGURE 1. As the control rod 124 moves to the left, the valve spools 104 and 114 are also moved in this direction by the link 116 to reduce the size of the opening of ports 96 and 106 of the valves 92 and 94 respectively. Flow through the valves is restricted causing pressure to increase in annular chambers 76 and 78, and the increased pressure acting upon the flange portions 60 and 62 of the piston 58 forces the piston toward the left. The piston acting through linkages such as 54 connecting the piston with the propeller blades, moves the propeller blades in a direction to increase their pitch. The valve ports 96 and 106 are opened when the control rod 124 is moved toward the right in the piston 58 and pressure is thereby reduced in the annular chambers 76 and 78. Twisting torque, due to aerodynamic forces acting upon the propeller blades, can then become effective to force the piston toward the right such that blade pitch is reduced. As the control rod 124 is moved either to the left or to the right in piston 58 and the valve spools 104 and 114 are correspondingly moved, the piston follows the movement of the valves very closely.

With the propeller of the invention, no dangerous condition results if there is a loss of pressure in one or the other of the annular chambers 76 or 78 due, for example, to a loss in the sealing effectiveness of the seal 64 or 66 respectively. Assuming that the propeller is functioning normally with each of the front and rear pistons carrying half load, and that pressure suddenly is reduced or lost in chamber 76 or 78, due for example to a seal 64 or 66 being damaged, the ports 96 and 106 are immediately closed by a slight rightward movement of the piston 58. Further rightward movement and a large decrease in pitch are prevented by the fluid in the chamber still effectively sealed. If pressure is lost in chamber 76, the working fluid in annular chamber 78, resists rightward movement of the piston 58, whereas if pressure is lost in chamber 78, the fluid in chamber 76 resists rightward movement of the piston. The fact that a failure has occurred is made known to a pilot by the visual indication means already referred to so that he may subsequently take steps to have the condition giving rise to the failure repaired. Operation of the visual indication means is initiated upon the loss of pressure in annular chamber 76 or 78 due to the unequal torque reaction resulting upon the ring gears 170 and 172 which causes member 202 to pivot and light lamp 216 as described. Pitch changes may be effected by movement of the control rod 124 as before, even though pressure is lost in one of the annular chambers 76 or 78. The valve associated with the chamber in which the loss in pressure has occurred is merely ineffective to control movement of the piston 58. The other valve, however, is effective to control pressure in the annular chamber with which it connects and movements of the piston are controlled by regulating pressure in this chamber as described.

Assuming the propeller is functioning normally with the propeller blades in some selected pitch position and one or the other of the valve spools becomes stuck in the partially open position corresponding to the selected pitch position so that it becomes impossible to move the one valve spool in the piston 58, the pitch changing mechanism of the propeller still remains operative. If the valve spool 114 is stuck, the link 116 will, nevertheless be caused to pivot on the ball 128 upon linear movement of the control rod 124. The valve spool 104 of valve 92 can, therefore, be positioned to open and close the port 96 and so regulate fluid pressure in annular chamber 76 to thereby increase or decrease blade pitch while pressure in the annual chamber 78 remains constant because of the constant sized opening of port 106 of the valve 94 due to the valve spool 114 being stuck in the piston 58. As pressure within the chamber 76 is varied with respect to pressure within the chamber 78, a resulting difference in torque reactions on the member 202 causes the member to operate one or the other of contacts 210 and 212 depending upon whether pressure in chamber 76 is increased or decreased, and thereby light the lamp 216 to make the pilot aware that the pitch changing mechanism of the propeller requires repair. If the valve spool 104 of valve 92 is stuck, the valve 94 may still be operated since the link 116 will pivot on ball 126 upon movement of control rod 124 to move valve spool 114 of valve 94 and open or close the port 106, and thereby control pressure in annular chamber 78 to position the piston 58. As pressure changes in the chamber 78 relative to the pressure in chamber 76 a resulting difference in torque reaction on opposite ends of the member 202 actuates the member to light lamp 216.

If the member 164 and control rod 124 are operated to move the spools of the valves 92 and 96 to the right to open the valve ports more widely for the purpose of decreasing blade pitch and one of the valve spools 104 or 114 becomes stuck in an opened position, the propeller may still be controlled to effect changes in blade angle. Although there would be a loss of pressure in the annular chamber 76 or 78 associated with the valve having the stuck spool, the other valve could nevertheless be positioned by moving the control rod 124 to pivot the link 116 about one end to control pressure in the annular chamber associated with the valve still operable and the position of the piston controlled in this manner.

Assuming the control rod 124 has been moved to the left to restrict the openings of the valve ports of the valves 92 and 94 for the purpose of increasing pitch, and one of the valve spools, for example the valve spool 104 of valve 92 becomes stuck, pressure in the associated annular chamber 76 increases and the piston 58 is driven toward the left increasing pitch. A large increase in blade angle produced in this manner, could result in stalling the engine or causing the airplane to crash. This, however, is prevented in the propeller of the invention. As the piston 58 moves toward the left the stuck valve spool 104, which remains fixed in the piston and moves with it, pivots the link 116 on the ball 120 causing the valve spool 114 to be moved toward the right in the piston and contact the plunger 142 of the poppet valve 140. The plunger 142 is moved to the right by the valve spool 114 to connect the left end of the poppet valve chamber 148 with drain line 158 and thereby relieve pressure on the left side of the piston 144. The piston 144 is thereupon moved to the left in the poppet valve chamber 148 by the hydraulic pressure of fluid supplied to the valve over line 156 from chamber 76, and fluid on the left side of piston 144 is caused to flow into and through line 158 from which it discharges into an enclosed space 214 at the front end of the piston. Movement of the piston 144 to the left results in connecting line 156 with the drain line 160 whereupon fluid drains from the annular chamber 76 through line 156, the poppet valve chamber, and line 160 into the hub. Pressure is thereby relieved in annular chamber 76 to prevent an uncontrolled increase in the pitch of the blades, and the valve 94 can thereafter be operated to control blade pitch by moving the control rod 124 to pivot link 116 on the ball 126 and so position the valve spool 114. Assuming the valve spool 114 becomes stuck in a closed position, pressure is increased in annular chamber 78 and the piston caused to move toward the left to increase pitch to a maximum blade angle. As the piston 58 moves toward the left it pivots link 116 on ball 120, and the link moves valve spool 104 of valve 92 toward the right to actuate the plunger 132 of poppet valve 130. The left end of the poppet valve chamber 138 is thereby connected to the drain line 152 and the pressure of hydraulic fluid supplied to the valve from line 154 forces the poppet valve piston 134 to the left, whereupon fluid on the left side of piston 134 is caused to flow into and through line 152 from which it discharges into the space 220 at the front end of piston 58. Line 154 is connected by movement of the piston 134 to the left of the poppet valve chamber with the line 150. Fluid flows from annular chamber 78, through the line 154, the poppet valve 130, line 150, into annular chamber 111, and from the chamber 111 through the hub passage 113 to the space between the nacelle housing 10 and hub 20. Pressure is relieved in the annular chamber 78 in this manner, and the valve spool 104 of valve 92 may thereafter be operated by moving control rod 124 to pivot the link 116 on ball 128 and thereby adjust the opening of valve port 96 of valve 92. The difference between the pressure in annular chamber 76 and in annular chamber 78, which results when one or the other of the valve spools 104 and 114 becomes stuck in the closed position, results in lighting the lamp 216 as in the manner hereinbefore described. Whenever oil discharged from lines 152 and 158 into the space 220 in front of piston 58 is accumulated in sufficient quantity it finds its way through passage 222 in control rod 124 and leaks through bearings 166 into the region 197 within the drive tube 34 from which it passes through opening 198 into the reservoir 181.

While only one form of the invention has been shown, it will be apparent to those skilled in the art that various changes and modifications may be made in the structure shown and described without departing from the spirit and scope of the invention as set out in the appended claims.

What is claimed is:

1. A propeller including propeller blades; cylindrical structure; a piston in the cylindrical structure operatively connected to said propeller blades, the cylindrical structure and piston being adapted to form a pair of pressure chambers therebetween and the piston being movable in the cylindrical structure in a direction to increase pitch upon an increase in pressure in the chambers and being movable in the cylindrical structure in the opposite direction by aerodynamic forces on the blades upon a decrease in pressure in the chambers; passage means extending to and from each chamber; pressure generating means connected with the passage means extending to the chambers for supplying pressurized fluid thereto; a control valve including a valve plunger in the passage means associated with each chamber for controlling pressure in the chambers; control means connected with the control valves for simultaneously moving the valve plungers to control flow through the valves, and including linkage means between the valve plungers enabling one plunger to move in the event the other plunger is restrained from moving; a drain line connected to each of the pressure chambers; and a normally closed valve located in the drain line of each chamber and operatively connected with the control valve for the other chamber for actuation to an open position in response to movement of the plunger of the control valve of such other chamber to an extreme position in the piston.

2. A propeller as defined in claim 1 wherein the pressure generating means comprises separate pump means for each chamber rotatable with the propeller, drive gear means for each of the separate pump means, and a reaction gear connected with each of the drive gear means, the propeller including a torque responsive device connected with the reaction gears and responsive to a difference in torque thereon due to a difference in pressure in the chambers supplied by the separate pump means, and signaling means operably connected with the torque responsive device for operation thereby upon the occurrence of said pressure differential.

3. A propeller including propeller blades, cylindrical structure; a piston in the cylindrical structure operatively connected to said propeller blades, the cylindrical structure and piston being adapted to form a pair of pressure chambers therebetween and the piston being movable in the cylindrical structure in a direction to increase pitch upon an increase in pressure in the chambers and being movable in the cylindrical structure in the opposite direction by aerodynamic forces on the blades upon a decrease in pressure in the chambers; passage means extending to and from each chamber; at least one pump rotatable with the propeller and connected with the passage means extending to one chamber for supplying pressurized fluid thereto; at least one other pump rotatable with the propeller and connected with the passage means extending to the other chamber for supplying pressurized fluid to said other chamber; a control valve including a valve plunger in the passage means associated with each chamber for controlling pressure in the chambers; control means associated with the control valves for simultaneously moving the valve plungers to control flow through the valves, and including linkage means between the valve plungers enabling one plunger to move in the event the other plunger is restrained from moving; a drive gear on each of said pumps; a reaction gear connected with each of the drive gears; a torque responsive device connected with the reaction gears and responsive to a difference in pressure in the chambers supplied by the pumps, and signaling means operably connected with the torque responsive device for operation thereby upon the occurrence of said pressure differential.

4. A propeller including propeller blades; cylindrical structure; a piston in the cylindrical structure operatively connected to said propeller blades, the cylindrical structure and piston being adapted to form a pair of pressure chambers therebetween and the piston being movable in the cylindrical structure in a direction to increase pitch upon an increase in pressure in the chambers and being movable in the cylindrical structure in the opposite direction by aerodynamic forces on the blades upon a decrease in pressure in the chambers; passage means extending to and from each chamber; pressure generating means connected with the passage means extending to the chambers for supplying pressurized fluid thereto; a control valve including a valve plunger in the passage means associated with each chamber for controlling pressure in the chambers; control means connected with the control valves for simultaneously moving the valve plungers to control flow through the valves, and including linkage means between the valve plungers enabling one plunger to move in the event the other plunger is restrained from moving; a drain line connected to each of the pressure chambers; and a normally closed valve located in the drain line of each chamber and including actuating means for opening the valve disposed for actuation by the plunger of the control valve of the other chamber upon movement of the plunger to an extreme position in the piston.

5. A propeller including propeller blades, cylindrical hub structure; a piston in the hub structure operatively connected to said propeller blades, the hub structure and piston being adapted to form a pair of pressure chambers therebetween and the piston being movable in the hub structure in a direction to increase pitch upon an increase in pressure in the chambers and being movable in the hub structure in the opposite direction by aerodynamic forces on the blades upon a decrease in pressure in the chambers; passage means in the hub structure extending to each chamber; pressure generating means connected with the said passage means for supplying pressurized fluid to the chambers; exit passage means in the piston extending from each chamber; a control valve including a valve plunger in the exit passage means for each chamber for controlling pressure in the chambers; control means connected with the valve plungers for simultaneously operating said valves including a control rod and including linkage means between the plungers pivotally mounted on the control rod and actuable to move one valve plunger upon movement of the piston when the other valve plunger is stuck in the piston; a drain line connected to each of the pressure chambers; and a normally closed valve located in the drain line of each chamber and operatively connected with the control valve for the other chamber for actuation to an open position in response to movement of the plunger of the control valve of such other chamber to an extreme position in the piston.

References Cited by the Examiner

UNITED STATES PATENTS

| | | | |
|---|---|---|---|
| 2,355,039 | 8/1944 | Eves | 170—160.32 |
| 2,388,276 | 11/1945 | McCoy | 170—160.18 |
| 2,597,361 | 5/1952 | Mott | 91—414 X |
| 2,597,418 | 5/1952 | Westbury et al. | 91—216 X |

FOREIGN PATENTS

| | | |
|---|---|---|
| 969,611 | 5/1950 | France. |

SAMUEL LEVINE, *Primary Examiner.*

JULIUS E. WEST, *Examiner.*